United States Patent
Agnew et al.

[11] Patent Number: 6,014,713
[45] Date of Patent: Jan. 11, 2000

[54] COMPUTER WITH RETRACTABLE OPTICAL FIBER CONNECTOR ASSEMBLY HAVING ROTATABLE SPOOL WITH OPTICAL FIBER FOR CONNECTING THE COMPUTER TO EXTERNAL COMPONENT

[75] Inventors: Palmer Wright Agnew, Owego; Douglas Kerr Ferguson; Anne Sheila Kellerman, both of Endicott; Thomas Ben Kellerman, Binghamton, all of N.Y.

[73] Assignee: International Business Machines Corporation, Armonk, N.Y.

[21] Appl. No.: 08/307,498

[22] Filed: Sep. 14, 1994

Related U.S. Application Data

[63] Continuation of application No. 08/135,373, Oct. 12, 1993, abandoned, which is a continuation of application No. 07/712,757, Jun. 10, 1991, abandoned.

[51] Int. Cl.[7] .................................................. G06F 13/00
[52] U.S. Cl. .............................................. 710/1; 385/90
[58] Field of Search ........................... 395/800; 385/134, 385/135, 147, 88, 92, 89, 55, 61, 90; 710/1

[56] References Cited

U.S. PATENT DOCUMENTS

| | | | |
|---|---|---|---|
| 3,922,063 | 11/1975 | Marrone | 385/26 |
| 3,934,246 | 1/1976 | Mueller | 385/88 |
| 4,332,435 | 6/1982 | Post | 350/96.2 |
| 4,427,879 | 1/1984 | Becher et al. | 250/215 |
| 4,441,785 | 4/1984 | Petrozello | 385/25 |
| 4,478,486 | 10/1984 | Fentress et al. | 350/96.2 |
| 4,668,044 | 5/1987 | D'Auria et al. | 385/92 |
| 4,673,245 | 6/1987 | Kling et al. | 385/80 |
| 4,753,510 | 6/1988 | Sezerman | 385/61 |
| 4,765,708 | 8/1988 | Becker et al. | 350/96.2 |
| 4,767,168 | 8/1988 | Grandy | 350/96.2 |
| 4,772,585 | 9/1988 | Boyer | 350/96.2 |
| 4,786,136 | 11/1988 | Cannon | 385/55 |
| 4,792,203 | 12/1988 | Nelson et al. | 350/96.2 |
| 4,793,682 | 12/1988 | Cooper | 350/96.2 |
| 4,798,432 | 1/1989 | Becker et al. | 350/96.2 |
| 4,802,724 | 2/1989 | Fraize | 350/96.2 |
| 4,863,233 | 9/1989 | Nienaber et al. | 385/89 |
| 4,883,337 | 11/1989 | Dahlgren | 350/96.29 |
| 4,886,336 | 12/1989 | Deusser et al. | 350/96.2 |
| 4,898,448 | 2/1990 | Cooper | 350/96.2 |
| 4,900,121 | 2/1990 | Becker et al. | 385/135 |
| 4,909,583 | 3/1990 | Williams, III et al. | 350/96.2 |
| 4,953,929 | 9/1990 | Basista | 350/96.2 |
| 5,005,939 | 4/1991 | Arvanitakis et al. | 350/96.2 |
| 5,024,498 | 6/1991 | Becker et al. | 350/96.1 |
| 5,029,968 | 7/1991 | Gelser, Jr. et al. | 357/80 |
| 5,039,194 | 8/1991 | Block et al. | 383/88 |
| 5,069,523 | 12/1991 | Finzel et al. | 385/135 |
| 5,090,792 | 2/1992 | Koht et al. | 385/32 |
| 5,093,878 | 3/1992 | Haley et al. | 385/92 |
| 5,109,983 | 5/1992 | Malone et al. | 206/408 |
| 5,131,745 | 7/1992 | Whitney et al. | 356/153 |
| 5,155,786 | 10/1992 | Ecker et al. | 385/94 |

FOREIGN PATENT DOCUMENTS

| | | |
|---|---|---|
| 0214701 | 3/1987 | European Pat. Off. . |
| 0375663 | 5/1989 | European Pat. Off. . |
| 2589589 | 10/1985 | France . |

*Primary Examiner*—Mehmet B. Geckil
*Attorney, Agent, or Firm*—Lawerence R. Fraley

[57] ABSTRACT

An electronic computer including microprocessor means, memory means and Input/Output (I/O) means wherein the I/O means comprises a retractable optical fiber connector assembly. The retractable optical fiber connector assembly includes a rotatable spool and a pair of optical fibers for being wound thereabout, these fibers in turn optically connected to optoelectronic means within the computer (as part of the I/O means). On the opposing ends of these optical fibers are desired connectors (e.g., those of the push-pull variety) for being connected to associated optical-type connectors which in turn may form part of various peripheral equipment (e.g., MODEMS, printers, etc.) or other computers to which this computer may be connected.

17 Claims, 4 Drawing Sheets

COMPUTER WITH RETRACTABLE OPTICAL FIBER CONNECTOR ASSEMBLY HAVING ROTATABLE SPOOL WITH OPTICAL FIBER FOR CONNECTING THE COMPUTER TO EXTERNAL COMPONENT

The application is a continuation of application Ser. No. 08/135,373, filed Oct. 12, 1993 now abandoned, which, is a continuation of application Ser. No. 07/712,757, filed Jun. 10, 1991 now abandoned.

TECHNICAL FIELD

This invention relates to electronic computers and more particularly to a new means of providing connection between a computer and various peripheral components (e.g., printers) typically used therewith. As defined, the invention particularly relates to such connections for computers of the portable variety (e.g., laptop). The teachings herein, however, are adaptable to substantially all types of computers.

BACKGROUND OF THE INVENTION

Typically, electronic computers are connected to various peripheral components, including modulator/demodulator (MODEM) and printer components, as well as other computers, using electrical connections. In the case of portable computers (particularly laptop types), a plurality of relatively large electrical cables are needed to accomplish such connections. Such cables may in turn be relatively heavy and/or cumbersome, thus substantially defeating some of the desired objectives of portable computers (e.g., compactness, relative ease of use, etc.).

As defined herein, the present invention defines the provision of enhanced computer connections through the utilization of optical fibers. As is known, optical fiber usage in the computer environment is growing. See, e.g., U.S. Pat. No. 4,953,929 as one example of a connector using optical fibers terminating in push-pull types of connectors. See also U.S. Pat. No. 5,005,939 as an example of an optoelectronic module for coupling a pair of optical fibers (e.g., located within a singular cable) to the electrical circuitry of an electronic computer. The module thus serves as a conversion means for converting incoming optical signals to electrical signals to pass these on through the computer's circuitry and for converting the computer's electrical signals to optical signals and passing these out through the fibers.

The advantages of optical fibers over other kinds of transmission media are well known. The potential bandwidth (or message carrying capacity) of optical fibers is extremely high. Systems using optical cables are resistant to electromagnetic interference which sometimes plagues systems having electrical cables. Moreover, optical cable systems are considered somewhat more secure than electrical cable systems since it is more difficult for unauthorized personnel to tap or access a fiber optic cable without being detected Typically, such cables, particularly those of the plastic core variety, are lightweight, flexible and kink resistant, making them especially adaptable to the portable computer environment.

Optical fiber cables use single or multiple strands of fibers each having an inner circular glass or plastic core coated with a circumferential cladding having a different index of refraction. Light is transmitted along the core and totally reflected from the interface between the core and cladding. Such devices can be used as transmission lines for transmitting information bearing light energy. An optical fiber transmission line can be formed from a single fiber or it can include a plurality of fibers bundled together as a cable. Additionally, several fiber transmission lines can be arranged in parallel for the simultaneous transmission of information along each of the separate lines, e.g., as in the aforementioned U.S. Pat. No. 5,005,939.

It is believed that a computer having an optical fiber connection means as defined herein will constitute a significant advancement in the art.

SUMMARY OF THE INVENTION

It is, therefore, a primary object of the present invention to enhance the art of electrical computers.

It is a further object of the invention to provide an electrical computer with a new and unique means for connecting same to other computers and various peripheral components such as printers and MODEMS.

It is a still further object of the invention to provide such a computer and connection means wherein optical fibers and the several advantages associated therewith are utilized.

It is yet another object of the invention to provide such an optical fiber connection means which is of relatively simple construction and relatively easy to utilize.

In accordance with one aspect of the invention, there is provided a computer including microprocessor means, memory means and input/output (I/O) means wherein the I/O means comprises a retractable optical fiber connector assembly. In one embodiment of the invention, this optical fiber connector assembly includes a rotatable spool and a pair of optical fibers adapted for being wound about the spool. These fibers in turn are optically aligned with and connected to associated optical means which may form part of the computer's I/O means.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
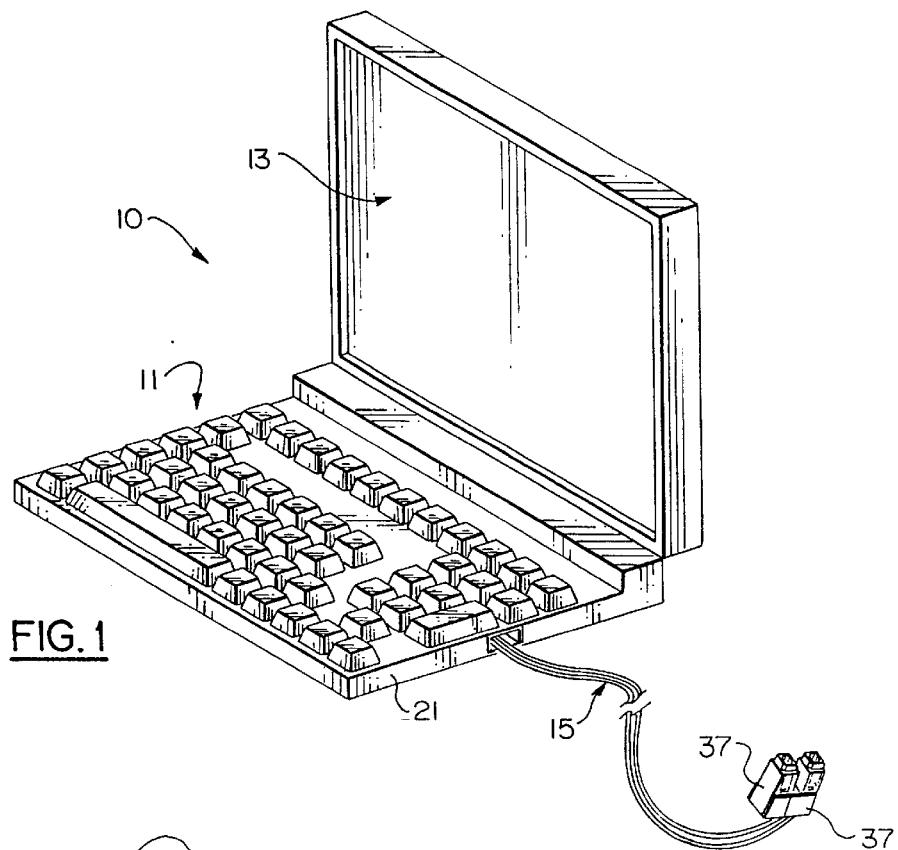
FIG. 1 is a perspective view of an electronic computer in accordance with one aspect of the invention.

In FIG. 1, there is shown a computer 10 in accordance with one embodiment of the invention. Computer 10, as illustrated, may be of the portable variety (e.g., a laptop), but it is understood that the invention is not limited thereto. Computer 10, as is known, includes a microprocessor unit (not shown), which, in one embodiment of the invention, may be of the type known in the art. Microprocessor units are well known in the computer art and are used to decode various instructions and use these to control the activity within the computer's system, in addition to performing arithmetic and logical computations. One example of such a microprocessor is referred to in the art as an Intel 80C88A microprocessor, with attributes of both eight and sixteen bit microprocessors. This microprocessor is available in eight MHz clock rate and offers two modes of operation. As stated, such a microprocessor represents one of several which may be utilized in the instant invention. Accordingly, further description is not believed necessary.

Computer 10, as shown in FIG. 1, further includes memory as is also known in existing computer systems. The memory (not shown) is utilized in a computer to store both data and instructions which are currently being used within the system. Such memory portions of a computer are well known in the art and are typically broken into several modules with each containing several thousand locations. Each location may in turn contain part or all of a datum or instruction and is associated with an identifier called a memory address (or, simply, an address). The aforementioned microprocessor unit accomplishes its work within the computer by successively inputting, or fetching, instructions from memory and carrying out the tasks dictated by them. As in the case of the aforementioned microprocessor unit, computer 10 as defined herein may utilize known memory currently used in many existing computer systems, and particularly those of the portable variety.

In addition to the above, computer 10 also includes an I/O subsystem which, as is known in the art, consists of a variety of devices for communicating with the peripheral world of the computer and for storing large quantities of information. In the case of computer 10, this I/O subsystem includes a keyboard 11 and an appropriate display 13 (e.g., liquid crystal display), in addition to other components, including those defined hereinbelow. As is well known in the computer industry, the computer's microprocessor, memory and I/O means are operatively coupled in order to function in a predetermined manner. Such coupling is particularly addressed and illustrated (see FIG. 1.1) in "Microcomputers and Microprocessors", John E. Uffenbeck, 1985 (Prentice-Hall) at pages 1–5, as well as in "The Computer Glossary", Alan Freedman, 1981, at pages 124–129, 374 and 375. Similar descriptions may be found in service manuals of various computer suppliers. See, e.g., the "Radio Shack Manual for TRS80 Model 100 Portable Computer, Catalog Number 26-3801/3802, date unknown, at pages 4-1 and 4-2. See also pages 2–4 of "Microcomputer Systems: The 8086/8088 Family", Yu-Cheng Liu, 1984, which provides an overview of microcomputer systems. This latter reference is considered especially noteworthy as it shows a particular example of how microprocessor, memory and I/O means in a computer are operatively coupled, in this example, by a system bus (FIG. 1-1). The teachings in these publications are incorporated herein by reference. Further description is not believed necessary.

In addition to the above, computer 10 may further include a power supply (e.g., an internal battery) and other components not mentioned herein.

In accordance with a significant aspect of the present invention, computer 10 further includes a new and unique means for providing suitable connection between the computer and appropriate peripheral components (e.g., MODEMS, printers, plotters, other computers, etc.). As defined herein, this new means of connection represents a substantial improvement over existing such connection means, particularly those currently utilized in many portable computers of the laptop variety. As defined, the invention eliminates many of the undesirable attributes (e.g., burdensome electrical cabling) while still assuring effective connection in a safe and relatively easily attainable manner.

Figure 2:
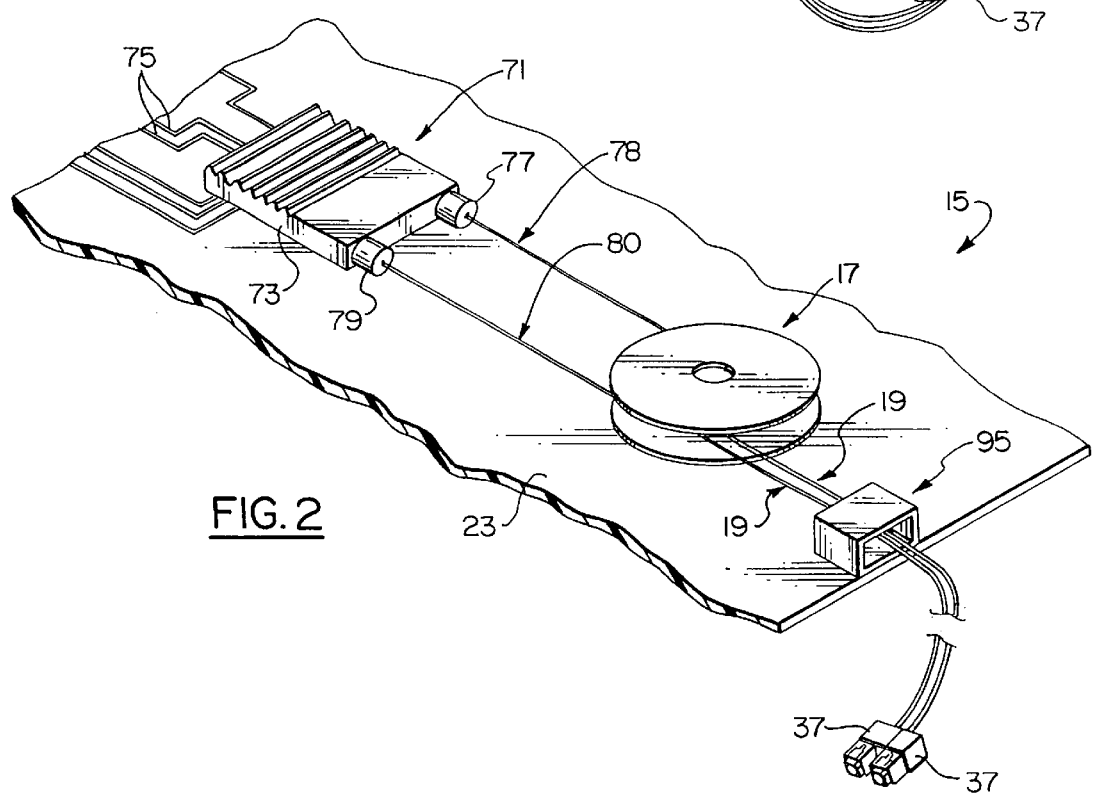
FIG. 2 is a partial perspective view of a retractable optical fiber connector assembly in accordance with one embodiment of the invention for use in the computer depicted in FIG. 1.
Figure 3:
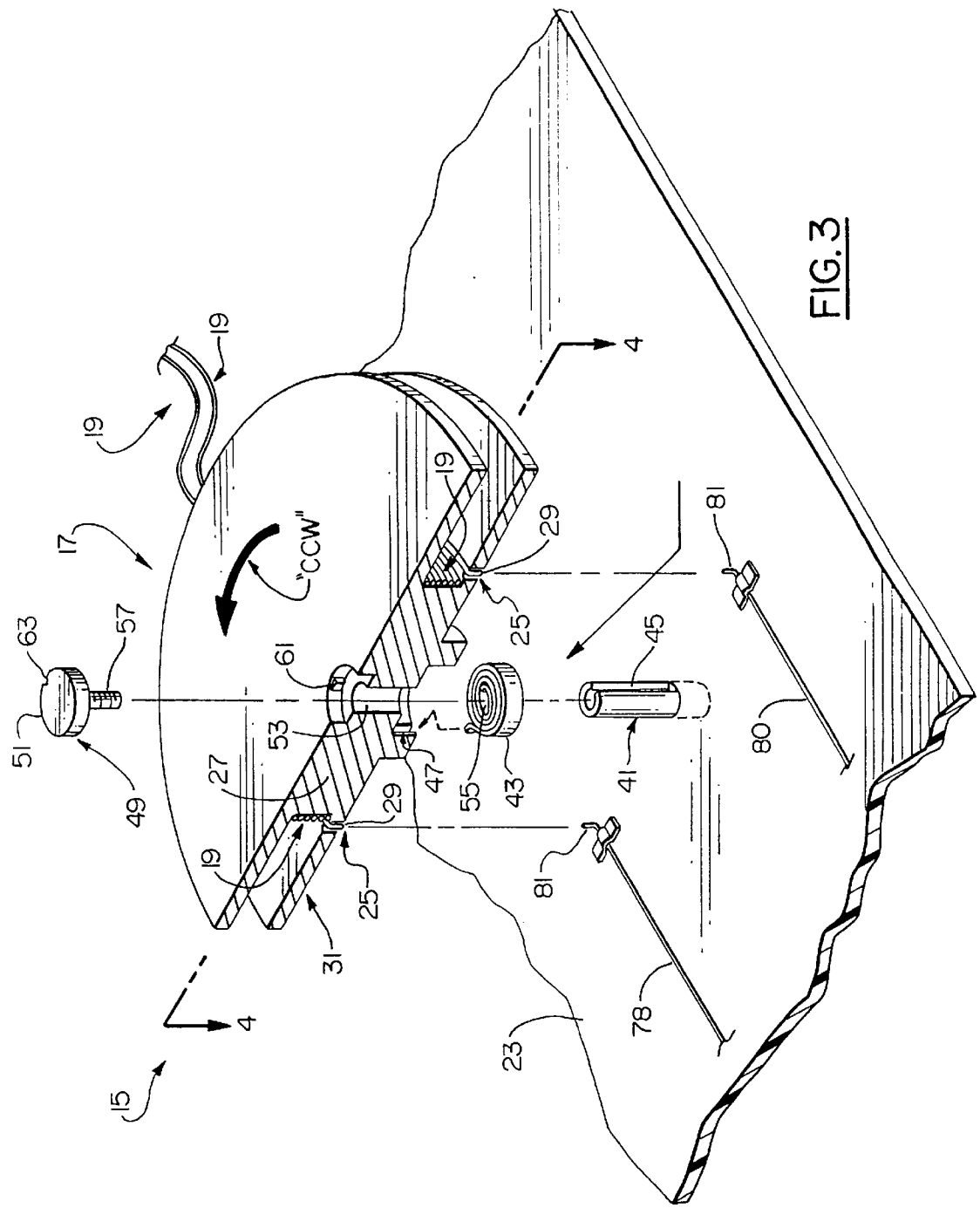
FIG. 3 is a much enlarged, partial perspective view of part of the optical fiber connector assembly of FIG. 2.
Figure 4:
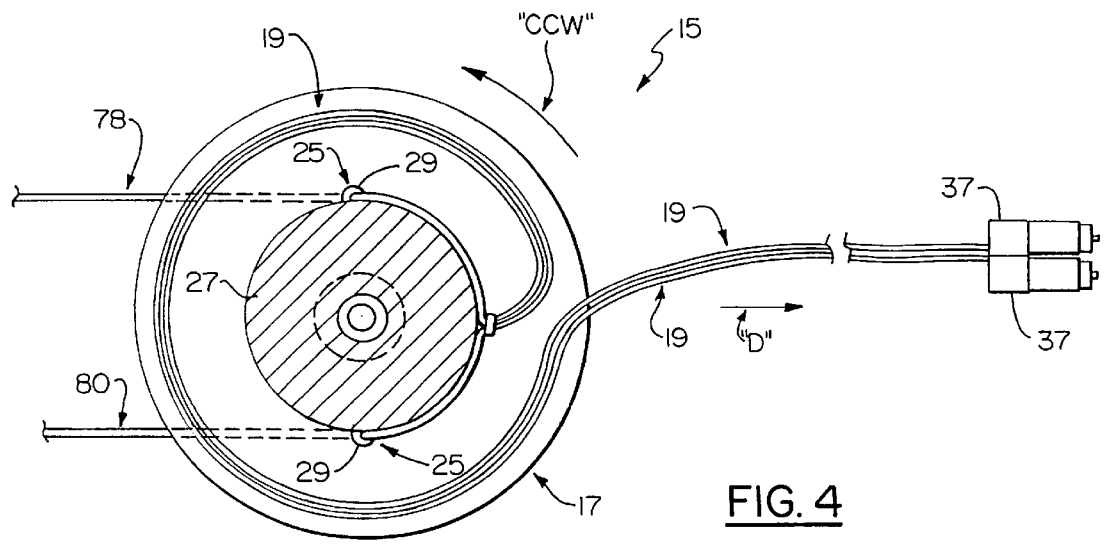
FIG. 4 is a plan view, in section, of the rotatable spool and optical fiber connectors of the invention as utilized in the embodiment depicted in FIG. 3, FIG. 4 being taken along the line 4—4 in FIG. 3.

As shown in the drawings, the I/O subsystem of computer 10 further includes a retractable optical fiber connector assembly 15 (only partially shown in FIG. 1) which, as described, utilizes the several aforementioned attributes of optical fiber technology. With particular attention to FIGS. 2–4, the retractable optical fiber connector assembly 15 is shown to include a rotatable spool 17 and a first pair of optical fibers 19 adapted for being wound about spool 17 during rotation thereof. For purposes of the invention, known optical fibers 19 may be utilized, such fibers typically encased within a protective covering (sheath). Preferably, fibers 19 are of the relatively low grade type (produced from plastic or the like material). Such plastic fibers are known in the art and are typically relatively thin, light, flexible and resistant to kinking. The invention is not limited to this particular type of fiber, however. Two such fibers are illustrated in the drawings, as shown in FIGS. 2–4. However, it is understood that both individual fibers may be spacedly positioned and contained within a singular protective covering to thus comprise a singular cable projecting from the housing 21 of computer 10. Two such cables are illustrated in the drawings for ease of understanding.

As stated, the pair of optical fibers 19 is adapted for being wound about spool 17 during spool rotation (as caused by the computer operator when initiating or terminating connection with an appropriate peripheral component). Spool 17, as shown, is designed for occupying a first aligned position on a substrate 23 which forms part of the invention's I/O means. Specifically, spool 17 is rotational on substrate 23 such that during the aforementioned first position, the terminal end 25 (FIG. 3) of each optical fiber is appropriately aligned optically with other structure (described below) of assembly 15. That is, the receiving and transmitting ends of the fibers are aligned, precisely, with the respective fibers from the transmitter and receiver components used in the invention. Such alignment, as understood, is critical for purposes of effective operation of the invention. In comparing FIGS. 3 and 4, these terminal ends 25 are preferably located on opposite sides of the central core section 27 at spool 17. Two apertures 29 are provided within the spool's lower portion 31 and designed for accommodating the respective terminal ends therein (see FIG. 3). As described herein, spool 17 is designed for rotating (e.g., in the direction "CCW" in FIGS. 3 and 4) when the computer operator draws on the optical fibers 19 (e.g., in the direction "D" (FIG. 4). Fibers 19 are represented in relatively loose alignment on spool 17 in FIG. 4 for illustration purposes, it being understood that these fibers are wound in a substantially tight manner about the central core 27 (see, e.g., FIG. 3).

At the opposite ends of fibers 19 from spool 17 are appropriate optical fiber connectors 37. As shown, each optical fiber terminates in a respective connector 37, which connector in turn is designed for being positioned within an appropriate optoelectronic receiving member (not shown) which in turn will form part of one of the aforementioned peripheral components to which computer 10 is connected. Examples of such optoelectronic receiver members are described in the aforementioned U.S. Pat. No. 5,005,939.

Optoelectronic receivers (a/k/a modules) designed for receiving such connectors are known in the art. The module as defined in U.S. Pat. No. 5,005,939 is preferred, however, in view of the several operational advantages thereof. These will be further defined below. The disclosure of U.S. Pat. No. 5,005,939 is incorporated herein by reference. The invention is not limited to this particular module, however, as other components known in the art may be successfully utilized herein. For example, with low end applications (e.g., lap top computers) wherein the aforedefined plastic fibers are utilized, the invention's transmitter could comprise an inexpensive, visible light-emitting diode (L.E.D.).

As stated, each optical fiber terminates in a connector 37. Examples of such connectors are known in the art. By way of example, one known optical fiber connector capable of being successfully utilized in the invention along with another, similar such connector, is available from the NTT (Nippon Telegraph and Telephone) International Corporation, Tokyo, Japan, and referred to as an SC-01 straight plug connector. These connectors each include a rectangular (in cross section) casing, as shown, and use a high precision ceramic ferrule. Alternatively, a less expensive plastic or metal ferrule could be utilized, particularly if the above-mentioned plastic fiber is used. Very low return loss is possible when using such connectors. The casings used in these connectors typically have a length of only about one inch and cross-sectional dimensions of only about 0.35 inch by about 0.29 inch. Such a connector is also capable of housing either single mode or multimode fibers, including those of the aforementioned plastic variety. A plastic material used for the outer casing of each connector is polybutylene terephthalate, having a twenty percent glass fiber reinforcement. As stated, each connector also includes a ferrule positioned therein and designed for accommodating the respective end of each optical fiber 19. Use of such a ferrule assures positive retention of the optical fiber's terminal end and subsequent alignment thereof with a second optical fiber (e.g., located within a corresponding ferrule) or other such optical component. Each such connector includes the aforementioned extending cable. It is understood that the invention is not limited to the aforementioned fiber optic connector but that other connectors, including those having different external configurations, (e.g., hexagonal, round, etc.) may also be effectively retained, aligned and positioned using the teachings herein. Such connectors are also described in U.S. Pat. No. 4,953,929, the disclosure of which is incorporated herein by reference.

In addition to the above, it is also possible to utilize what are referred to in the art as duplex connectors. Such a connector is known and typically includes a pair of individual fiber and ferrule subassemblies or the like positioned within a common housing, which housing in turn is designed for insertion within the receptacle portion of a known receiver, such as an optoelectronic module. As defined in U.S. Pat. No. 5,005,939, the module taught therein is also adapted for accommodating such duplex-type connectors. Further description of the various optical connectors which may be utilized in the invention is thus not believed necessary.

Spool 17 occupies a first position on substrate 23 to attain effective optical alignment between the terminal ends 25 of optical fibers 19 and associated optoelectronic structure which forms part of the computer's I/O subsystem. To accomplish this, spool 17 includes a central shaft 41 designed for being seated within substrate 23, the spool being rotatable about shaft 41 at the axis thereof, and a torsion spring 43 which, as illustrated in FIG. 3, is fixed at one end to shaft 41 (within a slot 45 thereof) and at the other end within the spool's central core 27 (within a slot 47 formed therein). Thus, as spool 17 is rotated in the illustrated direction ("CCW"), spring 43 exerts force on the spool to continually bias the spool to the return, aligned position shown in FIG. 3. During such rotation, it is understood that spool 17 may assume the aforementioned first position of optical alignment with each 360 degrees of rotation. To "capture" spool 17 in this desired position, spool 17 further includes a centrifugal clutch mechanism 49 in the form of a retention member 51 which is inserted through the core's central opening 53 and an internal opening 55 in spring 43, where this retention member 51 is screwed into shaft 41. Retention member 51 thus includes external threads 57 which engage internal threading (not shown) within shaft 41. As part of this clutch mechanism, a detent 61 is provided within the upper portion of central opening 53 and designed for engaging a notch 63 formed within member 51.

Figure 6:
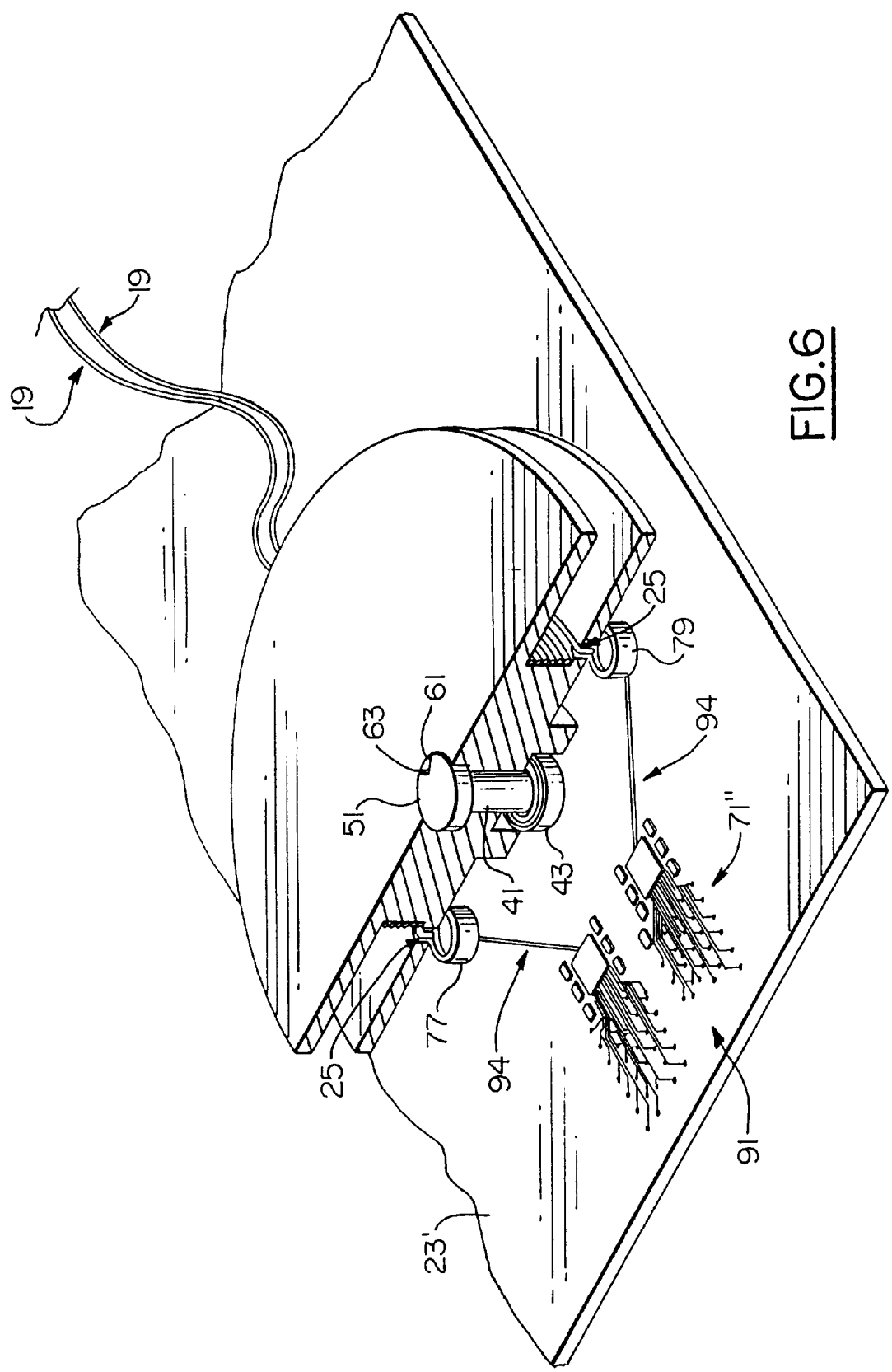
FIG. 6 represents a partial perspective view of part of an optical fiber connector assembly in accordance with yet another embodiment of the invention.

Thus, with each 360 degree rotation of spool 17, the described centrifugal clutch mechanism serves to retain the spool in the desired alignment position represented in FIG. 3. Release from this position may be achieved by exertion of appropriate force (e.g., in direction "D" in FIG. 4) in a manner somewhat similar to that of operating a typical window shade. The computer operator, as understood, is thus able to provide connection lines of various lengths, depending on need. Spool 17 is shown in the described aligned position (although with alternative I/O structure) in FIG. 6 with the aforementioned central shaft, torsion spring and retention members illustrated in their fully assembled position. As seen in FIG. 6, spring 43 is wound substantially about shaft 41.

In accordance with the teachings herein, the invention's I/O subsystem further includes optoelectronic conversion structure 71 (FIG. 2) for converting optical signals passing through a respective one of the optical fibers 19 to electrical signals and also for converting electrical signals from the computer to optical signals which then pass from computer 10 through one of the optical fibers 19. A preferred optoelectronic conversion structure for use in the present invention is described in the aforementioned U.S. Pat. No. 5,005,939. As defined therein, structure 71 comprises an optoelectronic module with a housing 73 designed for being positioned on a suitable substrate (e.g., a printed circuit board) so as to be electrically connected to the circuitry (e.g., circuit lines 75) thereof. As defined in U.S. Pat. No. 5,005,939, the optoelectronic module includes conductive pins or the like (not shown herein) which are adaptable to being inserted within respective openings within such a substrate for connecting to the respective circuitry thereof. Thus, it is understood that in a preferred embodiment of the invention, substrate 23 as shown herein represents a printed circuit board, and more preferably, such a board of a multilayered variety. Such boards are well known in the art and further description is not believed necessary. As defined in U.S. Pat. No. 5,005,939, the optoelectronic module includes a pair of optical subassemblies (referred to as optoelectronic devices in U.S. Pat. No. 5,005,939) for providing the aforementioned dual conversion capabilities. By way of example, in FIG. 2 one such subassembly is represented by the numeral 77 and functions as the optical receiving component for structure 71, thus designed for receiving optical data signals and for converting these to electrical signals for eventual passage into the substrate 23 (circuit board). Subassembly 77, as described in U.S. Pat. No. 5,005,939, preferably includes a header for mechanical support, a lens for focusing the optical input onto the die also used therein, and projecting wiring for connection to circuitry within the respective substrate. The die material may include silicon or galium arsenide, as is known in the art. Further description of this component is thus not believed necessary. To provide optical connection between the optical subassembly 77 and a respective terminal end 25 of one of the optical fibers 19, a singular fiber 78 is optically connected to subassembly 77 and positioned on an upper surface of substrate 23. Fiber 78 is retained in position so as to be optically aligned with the respective terminal end (that to the left in FIG. 3) as shown in FIG. 3. Similarly, the invention's optoelectronic conversion structure 71 further includes a second optical subassembly 79 which, as defined in U.S. Pat. No. 5,005,939, serves as a transducer for converting electrical signals from the substrate 23 to desired optical data for passage outwardly through the remaining of the optical fibers 19. Subassembly 79 thus serves as a transmitter of optical signals, and may be optically connected to the remaining terminal end 25 utilizing an extending optical fiber 80, as shown in FIGS. 2 and 3.

As defined, the optoelectronic conversion means of the invention may thus include a second pair of optical fibers (78, 80) which in turn will include exposed end segments 81 (FIG. 3) which, as shown, are securedly positioned in fixed manner on substrate 23 so as to be precisely aligned with associated terminal ends 25 of fibers 19. It is understood that the manner of accomplishing this alignment as depicted herein is primarily shown for illustration purposes. That is, it is understood that additional structure may be utilized to more effectively accomplish such alignment than in the manner shown. The illustrated opposed alignment of respective optical fiber ends may be accomplished using relatively low grade optical fiber (e.g., that produced from plastic or the like material as a cost reduction measure). Such plastic fiber, as mentioned above, is known in the art and is relatively thin, light, flexible and also resistant to kinking. Such fiber may be utilized with many current portable computers due to the lesser bandwidth requirements for such components. Should higher bandwidths be desired, more elaborate alignment structure may in turn be required and desirable. One example of a suitable plastic fiber which may be utilized in lower bandwidth applications is available from the Mitsubishi Corporation, under the product name ESKA 4001A.

Figure 5:
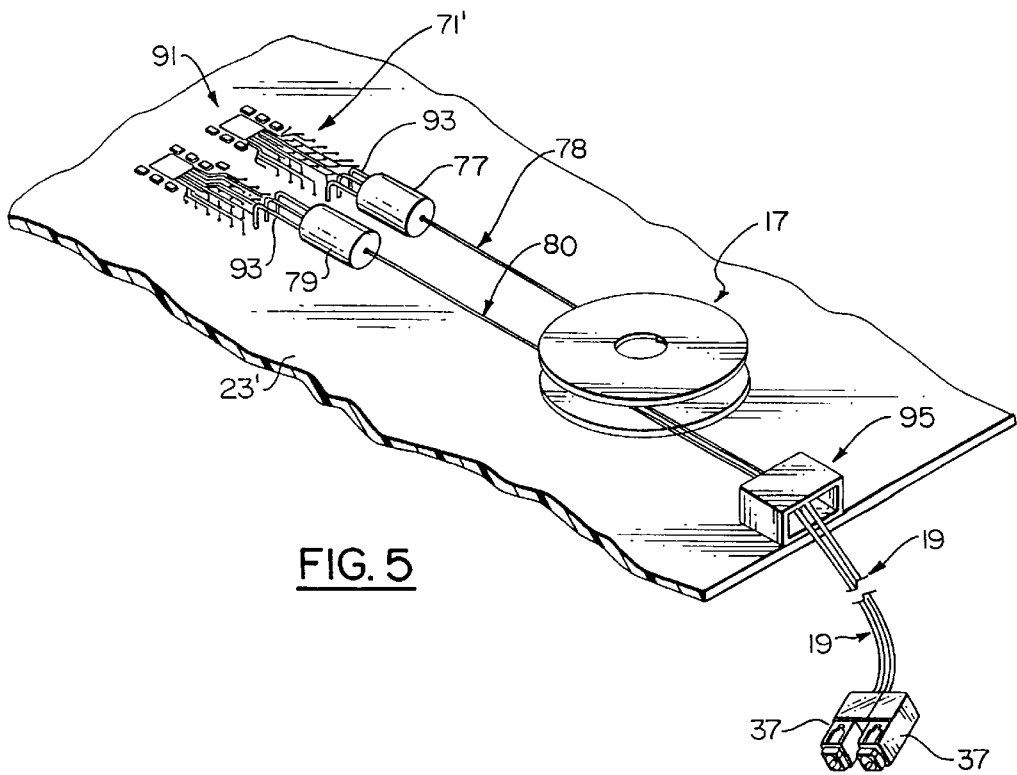
FIG. 5 is a partial perspective view of an optical fiber connector assembly in accordance with another embodiment of the invention.

In FIG. 5, there is shown a retractable optical fiber connector assembly in accordance with an alternative embodiment of the invention. This assembly includes a spool 17 of the type described above, in addition to a modified version of an optoelectronic conversion means as described in FIG. 2 above.

Specifically, this conversion structure 71' utilizes the various circuitry thereof (again, such circuitry may be similar to that used in the optoelectronic structure defined in U.S. Pat. No. 5,005,939) located on an upper surface of I/O substrate 23'. Such circuitry is represented by the numeral 91, with different circuitized sections thereof each functioning with respect to a respective optical subassembly 77 and 79. Understandably, these subassemblies may be similar to those in the structure 71 described above. As shown, the external electrical wiring 93 thereof may be positioned within substrate 23' to be electrically connected to the various sections of circuitry 91. Coupling optical fibers 78 and 80 may be utilized, as were so in the embodiment described above.

In FIG. 6, yet another embodiment of an optoelectronic conversion structure is shown. This structure, referred to as 71", will also include various circuitized sections of desired circuitry 91 positioned on the substrate's upper surface, the substrate somewhat similar to that in FIG. 5. Structure 71" also includes the optical subassemblies 77 and 79 but, significantly, spacedly locates these within substrate 23' such that the ends thereof (including the aforementioned lensing, etc.) are critically aligned with respective terminal ends 25 of fibers 19. This is accomplished by providing a suitable aperture or the like within substrate 23' and seating the respective optical subassembly (77, 79) therein. Connection to the circuitry 91 is thus accomplished electrically using electrical wiring 94 (between the respective circuitized sections and each respective subassembly).

As stated above, the optical fibers 19 may be extended a desired distance to make the necessary connection with the desired peripheral components to which computer 10 is to be coupled. In the retracted position, it is preferred that the optical connectors (e.g., 37) be contained within a suitable housing 95, such as illustrated in FIGS. 2 and 5. As shown, housing 95 may be positioned on substrate 23 or may also form part of housing 21 (FIG. 1). The latter arrangement may be desired in the event that spool 17 is to be mounted on a non-circuit board type of substrate. In such an arrangement, such a circuit board may then be positioned on this substrate to function in the manner described herein. The invention is thus not limited to substrate embodiments of the type particularly shown in FIGS. 2–6. In yet another embodiment, the described retractable spool assembly may be located separately from the main housing for computer 10 and include appropriate connectors (e.g., connectors 37) at opposing ends of both pairs of fibers. One pair of connectors could mate with the computer's optical subassemblies (e.g., as in U.S. Pat. No. 5,005,939) while the opposed pair would plug directly into a selected peripheral component such as mentioned above. The retractable spool would thus serve as an interim member to take up and feed out fiber as demanded. Significantly, this entire connector-spool assembly would serve as a separate structure from the main computer housing as depicted in FIG. 1, thus adding even more versatility to the present invention.

Thus there has been shown and described a computer wherein a new and improved connection assembly is taught for optically connecting the computer to desired peripheral equipment. As defined, this connection means involves the utilization of optical fibers and the several distinct advantages thereof. The connector assembly as taught herein is of relatively simple construction and can be operated in a safe, effective and relatively easy manner by the computer operator.

While there have been shown and described what are at present considered the preferred embodiments of the invention, it will be obvious to those skilled in the art that various changes and modifications may be made therein without departing from the scope of the invention as defined by the appended claims.

What is claimed is:

1. A computer comprising microprocessor means, memory means and I/O means operatively coupled together, said I/O means including associated optoelectronic structure including a substrate and an optical subassembly including at least one plastic optical fiber, said I/O means further including a retractable optical fiber connector assembly having a rotatable spool rotatably positioned on said substrate of said I/O means, at least one plastic optical fiber adapted for being wound about said spool and including a terminal end, said plastic optical fiber wound about said spool adapted for optically coupling said computer to a peripheral component, said rotatable spool including means for retaining said terminal end of said plastic optical fiber wound about said spool such that said terminal end is optically aligned with said plastic optical fiber of said optical subassembly of said associated optoelectronic structure of said I/O means of said computer in an end-to-end, facing relationship when said spool is rotated to a predetermined position on said substrate of said I/O means.

2. The computer according to claim 1 wherein said computer is a portable computer.

3. The computer according to claim 1 wherein said rotatable spool includes a pair of such plastic optical fibers adapted for being wound about said spool during rotation thereof and said optoelectronic structure includes a pair of said optical subassemblies each having a plastic optical fiber having a terminal end, each of said plastic optical fibers on said spool including one of said terminal ends for being retained by said spool and optically aligned with a respective, corresponding terminal end of said plastic optical fibers of said optical subassemblies of said associated optoelectronic structure at said predetermined position on said substrate.

4. The computer according to claim 3 wherein said associated optoelectronic structure further comprises optoelectronic conversion means for converting optical signals passing through one of said plastic optical fibers of one of said optical subassemblies to electrical signals and for converting electrical signals from said computer to optical signals for passing through the other of said plastic optical fibers of the other of said optical subassemblies.

5. The computer according to claim 4 wherein said substrate of said I/O means comprises a circuit board, said optoelectronic conversion means including an optoelectronic module having said optical subassemblies as part thereof, said module positioned on said circuit board and electrically connected thereto.

6. The computer according to claim 5 wherein said optical subassemblies are located on said circuit board.

7. The computer according to claim 3 wherein said optical fiber connector assembly further includes a pair of optical fiber connectors, each of said plastic optical fibers wound about said spool being optically connected to a respective one of said optical fiber connectors.

8. The computer according to claim 5 wherein said rotatable spool includes a central shaft, said spool rotatable about said shaft, a torsion spring operatively connected to said shaft and spool, and a clutch mechanism for engaging said spool to maintain said spool in said predetermined position of rotation on said substrate.

9. The computer according to claim 8 wherein said rotatable spool further includes a retention member for retaining said spool on said shaft during rotation of said spool.

10. A computer comprising microprocessor means, memory means and I/O means operatively coupled together, said I/O means including associated optoelectronic structure including a substrate and at least one optical subassembly component, said I/O means further including a retractable optical fiber connector assembly having a rotatable spool rotatably positioned on said substrate of said I/O means, at least one optical fiber adapted for being wound about said spool and including a terminal end, said optical fiber wound about said spool adapted for optically coupling said computer to a peripheral component, said rotatable spool including means for retaining said terminal end of said optical fiber such that said terminal end is optically aligned with said optical subassembly component of said associated optoelectronic structure of said I/O means of said computer in an end-to-end, facing relationship when said spool is rotated to a predetermined position on said substrate of said I/O means.

11. The computer according to claim 10 wherein said computer is a portable computer.

12. The computer according to claim 10 wherein said rotatable spool includes a pair of such optical fibers adapted for being wound about said spool during rotation thereof and said optoelectronic structure includes a pair of said optical subassembly components, each of said fibers including one of said terminal ends for being retained by said spool and optically aligned with a respective one of said optical subassembly components of said associated optoelectronic structure at said position on said substrate.

13. The computer according to claim 12 wherein said associated optoelectronic structure comprises optoelectronic conversion means for converting optical signals passing through one of said optical fibers to electrical signals and for converting electrical signals from said computer to optical signals for passing through the other of said optical fibers.

14. The computer according to claim 13 wherein said substrate of said I/O means comprises a circuit board, said optoelectronic conversion means including an optoelectronic module having said optical subassembly components as part thereof, said module positioned on said circuit board and electrically connected thereto.

15. The computer according to claim 12 wherein said optical fiber connector assembly further includes a pair of optical fiber connectors, each of said optical fibers of said pair of optical fibers wound about said spool being optically connected to a respective one of said optical fiber connectors.

16. The computer according to claim 10 wherein said rotatable spool includes a central shaft, said spool rotatable about said shaft, a torsion spring operatively connected to said shaft and spool, and a clutch mechanism for engaging said spool to maintain said spool in said predetermined position on said substrate.

17. The computer according to claim 16 wherein said rotatable spool further includes a retention member for retaining said spool on said shaft during rotation of said spool.

* * * * *